United States Patent
Hsieh

(10) Patent No.: US 7,948,360 B2
(45) Date of Patent: May 24, 2011

(54) WRITE-PROTECTION MODULE AND METHOD FOR STORAGE DEVICE

(75) Inventor: Chun-Yu Hsieh, Taichung (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 901 days.

(21) Appl. No.: 11/867,001

(22) Filed: Oct. 4, 2007

(65) Prior Publication Data

US 2009/0045914 A1    Feb. 19, 2009

(30) Foreign Application Priority Data

Aug. 13, 2007   (TW) ............................... 96129850 A

(51) Int. Cl.
| | |
|---|---|
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08C 19/00 | (2006.01) |
| H04B 1/00 | (2006.01) |
| H04B 3/00 | (2006.01) |
| H04L 9/32 | (2006.01) |
| H04Q 1/00 | (2006.01) |
| H04Q 9/00 | (2006.01) |

(52) U.S. Cl. .................. 340/5.74; 340/5.51; 340/5.52; 340/5.53; 340/5.54; 340/5.83; 382/115; 382/116; 382/117; 382/124; 711/152; 711/153; 711/164

(58) Field of Classification Search ........ 340/5.51–5.57, 340/5.74, 5.83; 726/16–17; 382/115–124; 713/186, 168; 711/152–164

See application file for complete search history.

(56) References Cited

U.S. PATENT DOCUMENTS

| 4,575,621 A | * | 3/1986 | Dreifus .......................... 235/380 |
| 4,969,180 A | * | 11/1990 | Watterson et al. ............ 379/56.1 |
| 5,212,664 A | * | 5/1993 | Shinohara ..................... 365/229 |
| 5,300,875 A | * | 4/1994 | Tuttle ............................. 320/138 |
| 5,457,447 A | * | 10/1995 | Ghaem et al. .............. 340/10.42 |

(Continued)

FOREIGN PATENT DOCUMENTS

TW     1435761     8/2003

(Continued)

OTHER PUBLICATIONS

"1st Office Action of China Counterpart Application" issued on Mar. 8, 2010, p. 1-p. 7.

*Primary Examiner* — Daniel Wu
*Assistant Examiner* — Mohamed Barakat
(74) *Attorney, Agent, or Firm* — Winston Hsu; Scott Margo

(57) ABSTRACT

A write-protection module for a storage device and the method thereof are disclosed. The write-protection module includes a power supply circuit, a fingerprint sensor, a database, and a microprocessor. The microprocessor for receiving the working power produced by the power supply circuit to maintain operation is respectively coupled to the power supply circuit, the fingerprint sensor, and the database. The fingerprint sensor receives the fingerprint input of a user, and the microprocessor receives the output signal of the fingerprint sensor and converts the output signal into an input cryptograph. Finally, the microprocessor compares the input cryptograph with a predetermined cryptograph stored in the database to produce a comparison information, and determines whether or not the user may access data.

18 Claims, 2 Drawing Sheets

U.S. PATENT DOCUMENTS

| | | | |
|---|---|---|---|
| 5,585,787 A * | 12/1996 | Wallerstein | 340/5.42 |
| 5,964,877 A * | 10/1999 | Victor et al. | 726/18 |
| 6,325,285 B1 * | 12/2001 | Baratelli | 235/380 |
| 6,487,069 B1 * | 11/2002 | Onodera | 361/679.09 |
| 7,213,766 B2 * | 5/2007 | Ryan et al. | 235/492 |
| 7,252,240 B1 | 8/2007 | Jones et al. | |
| 7,301,442 B2 * | 11/2007 | Kolpasky et al. | 340/426.13 |
| 7,740,179 B2 * | 6/2010 | Mattlin et al. | 235/492 |
| 7,808,206 B2 * | 10/2010 | Nagatsuka et al. | 320/108 |
| 2004/0233039 A1 * | 11/2004 | Beenau et al. | 340/5.83 |
| 2006/0260335 A1 * | 11/2006 | Montuoro et al. | 62/236 |

FOREIGN PATENT DOCUMENTS

| | | |
|---|---|---|
| TW | 578106 | 3/2004 |
| TW | 2779485 | 5/2006 |

* cited by examiner

WRITE-PROTECTION MODULE AND METHOD FOR STORAGE DEVICE

CROSS-REFERENCE TO RELATED APPLICATION

This application claims the priority benefit of Taiwan application serial no. 96129850, filed on Aug. 13, 2007. All disclosure of the Taiwan application is incorporated herein by reference.

BACKGROUND OF THE INVENTION

1. Field of the Invention

The present invention relates to a write-protection module for a storage device and the method thereof. More particularly, the present invention relates to a write-protection module for a storage device having a user identification function and the method thereof.

2. Description of Related Art

With a blooming development of the computer industry in the twenty first century, computers have become indispensable tools in our daily life. The computers are utilized and relied upon all the time, and most of important data are stored in the computers.

Generally, a method of preventing leakage of the important data is to set a cryptograph. However, with development of technologies, cracking techniques of the cryptograph improved accordingly, and therefore just setting the cryptograph for protecting the data and files is not practical. Moreover, if the cryptograph is forgotten, it will cause a lot of troubles.

Since development of the computers has a general trend towards miniaturization, powerful and multi-functional, number of communication ports for connecting peripheral devices of the computer and storage devices (such as hard disk, CD-ROM etc.) are decreased accordingly. Correspondingly, with decreasing of the communication ports, hubs for connecting external hardware gradually become a mainstream, and this leads to a widespread use of memory cards, flash drives, and external hard disks.

Users may store data in the memory cards or the flash drives, or read the data stored in the memory cards or the flash drives via computer. Since such electronic products have small sizes, they are easy to be lost during utilization, and someone else may obtain the stored data, which may cause a leakage of the data.

Presently, a biologic identification technique is applied for substituting the conventional method of just setting the cryptograph, by which fingerprint, iris, voice or shape of face of a user is used for setting the cryptograph of the memory card. Since different people have different biologic features (such as voice, fingerprint), security of the data or the files can be ensured.

However, encryption and decryption of such storage devices are operable only when the storage devices are connected with the computers. Therefore, to obtain the data stored in the storage devices, a computer should be found to perform the decryption, and this will be inconvenience for utilization.

SUMMARY OF THE INVENTION

Accordingly, the present invention is directed to a method of directly performing decryption of a storage device, and performing writing or reading on the storage device without using a computer.

The present invention is directed to a storage device having a user identification function. The storage device may automatically convert a natural energy into a working power for its operation without aiding of external power supply.

The present invention is directed to a write-protection module for a storage device, the write-protection module may identify a user's identity information and confirm the user's identity, so as to determine whether the user is allowed to access the storage device. Accordingly, protection of data is achieved.

The present invention is directed to a write-protection method for a storage device, the method has the same features with that of the aforementioned enhanced features.

According to an embodiment of the present invention, a storage device having a user identification function is provided. The storage device includes a power supply module, a user identification module, a control unit, an interface unit and a storage unit. The user identification module is coupled to the power supply module and the control unit, and the power supply module is used for supply the working power to the user identification module. The power supply module further includes a first power unit, a second power unit and a power controller. The first power unit may supply a power. Moreover, the power controller may be coupled to the first power unit and the second power unit, and the power controller may charge the second power unit according to the output power of the first power unit and generate the working power.

The user identification module receives an input user's identity information and converts the user's identity information into an input cryptograph. Then, the input cryptograph is compared with a predetermined cryptograph stored in the user identification module to generate a comparison information for the control unit.

The control unit is further coupled to the interface unit. After the control unit receives the comparison information generated from the user identification module, whether or not the user may access the data stored in the storage unit via the interface unit is then determined according to the comparison information.

According to another aspect of the present invention, a write-protection module for a storage device is provided. The write-protection module includes a power supply module, a fingerprint sensor, a database, and a microprocessor. The microprocessor is respectively coupled to the power supply module, the fingerprint sensor, and the database. The power supply module supplies a working power to the microprocessor for maintaining a normal operation of the write-protection module. The fingerprint sensor receives the fingerprint input of a user and outputs an output signal. The power supply module further includes a first power unit, a second power unit and a power controller. The first power unit may supply a power. Moreover, the power controller may be coupled to the first power unit and the second power unit, and the power controller may charge the second power unit according to the output power of the first power unit and generate the working power.

The microprocessor receives an output signal of the fingerprint sensor and converts the output signal into an input cryptograph. Finally, the microprocessor compares the input cryptograph with a predetermined cryptograph stored in the database to generate a comparison information, and determines whether or not the user may access the data.

According to still another aspect of the present invention, a write-protection method for a storage device is provided. The method includes the following steps. First, a natural energy is converted, such that the storage device may provide a working power. Next, inputting of a user's identity information is detected based on the working power. Finally, if the user's identity information is input, the user's identity information is then identified to determine whether or not the user may access the data stored in the storage device.

In the write-protection module for a storage device having a user identification function and the method thereof, the power supply module may automatically convert the natural energy into the working power, and therefore external power supply for providing the working power is unnecessary. Moreover, encryption and decryption of the storage device can be performed directly without aiding of the application programmes of external software. Therefore, convenience of utilization is achieved.

In order to make the aforementioned and other objects, features and advantages of the present invention comprehensible, a preferred embodiment accompanied with figures is described in detail below.

DESCRIPTION OF EMBODIMENTS

Figure 1:
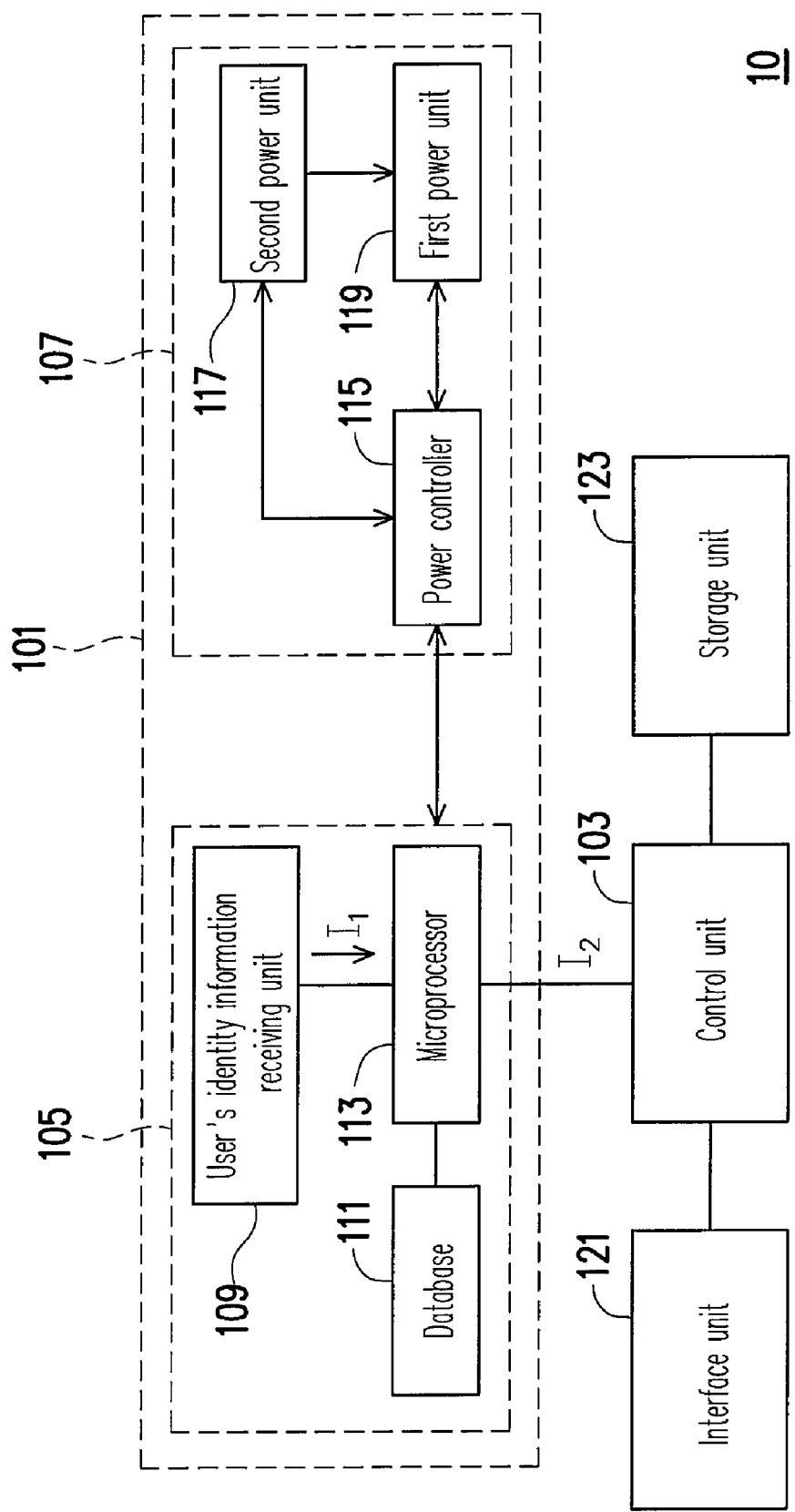
FIG. 1 is a block diagram illustrating a circuit of a storage device 10 having a user identification function according to an embodiment of the present invention.

FIG. 1 is a block diagram illustrating a circuit of a storage device 10 having a user identification function according to an embodiment of the present invention. The user identification may be achieved by a user identification device. Referring to FIG. 1, the storage device 10 provided by the present invention may be a memory card or a flash drive having a fingerprint identification function. The storage device 10 at least includes a write-protection module 101 and a control unit 103 coupled to the write-protection module 101. The control unit 103 may determine whether or not the storage device 10 may be operated normally according to a comparison signal $I_2$ output from the write-protection module 101.

In the present embodiment, the storage device 10 may further includes an interface unit 121 and a storage unit 123. The interface unit 121 and the storage unit 123 are respectively coupled to the control unit 103. The interface unit 121 may be coupled to external computer devices, such that accessing and writing of data of the storage device 10 can be performed. The interface unit 121 may be a universal serial bus (USB) interface, a memory card interface, an IEEE1394 or an external serial ATA (eSATA) transmission interface. The storage unit 123 may be a flash drive storing the data that user required.

The write-protection module 101 provided by the present invention may include a power supply module 107, and a user identification module 105 coupled to the power supply module 107. The user identification module 105 includes a user's identity information receiving unit 109, a database 111 and a microprocessor 113. The microprocessor 113 is respectively coupled to the database 111, the user's identity information receiving unit 109 and the control unit 103. Particularly, the power supply module 107 at least includes a first power unit 119, a second power unit 117 and a power controller 115. The power controller 115 is respectively coupled to the first power unit 119, the second power unit 117 and the user identification module 105 for providing power to the write-protection module 101.

In the present embodiment, the user's identity information receiving unit 109 may be a fingerprint sensor or a voice recognition device, which may receives an external identity information input of a user, and the input identity information of the user may be a fingerprint, an iris image, a voice information or an image of face shape etc. The first power unit 119 is a continuous power supply, which may store the natural energy into a battery (such as a solar battery) to serve a working power. The second power unit 117 is a chargeable power device (such as a lithium rechargeable battery), and a part of the working power generated by the first power unit 119 may charge the second power unit 117.

When the storage device 10 is in a standby mode, the first power unit 119 of the power supply module 107 may maintain a minimum working power required by the user identification module 105 for detecting user's identity information, and charge the second power unit 117. The working power of the first power unit 119 is converted from the natural energy (such as solar energy and environmental light source etc.).

When the user's identity information is input to the user's identity information receiving unit 109 of the user identification module 105, the first power unit 119 detects the inputting of the user's identity information and activates the user identification module 105. Meanwhile, the power controller 115 switches the power supply of the storage device 10 from the first power unit 119 to the second power unit 117, so as to supply a power to the user identification module 105 for an operation of encryption or decryption.

On the other hand, after the user's identity information receiving unit 109 receives a biologic information, an output signal $I_1$ is output to the microprocessor 113. The microprocessor 113 receives and encodes the output signal $I_1$. Then, the microprocessor 113 compares the encoded output signal $I_1$ with a predetermined cryptograph stored in the database 111.

After the comparison is successful, the microprocessor 113 outputs a confirmation signal I2 to the control unit 103. The control unit 103 receives the confirmation signal I2, and then connects to the storage unit 123. Then, data can be written or read to/from the storage unit 123 via the interface unit 121. Meanwhile, the power controller 115 switches the power supply of the storage device 10 from the second power unit 117 to the first power unit 119 for saving the power.

Figure 2:
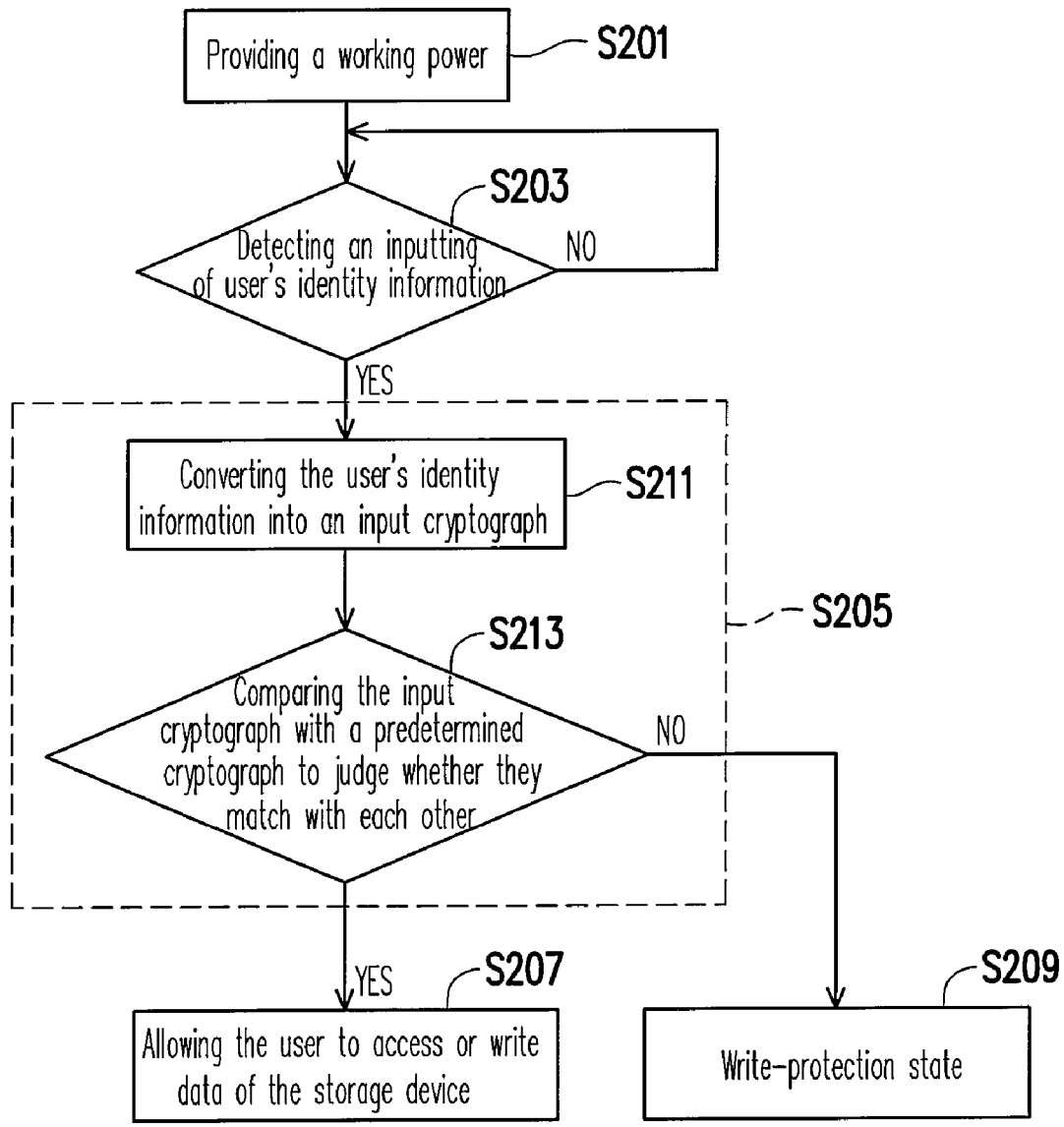
FIG. 2 is a flowchart illustrating a write-protection method for a storage device according to an embodiment of the present invention.

FIG. 2 is a flowchart illustrating a write-protection method for a storage device according to an embodiment of the present invention. Referring to FIG. 2, in the present embodiment, the working power is first provided to the user identification module (step S201). In an embodiment of the present invention, the working power is converted from the solar energy, and therefore the storage device may have a continuous power supply.

Next, inputting of the user's identity information to the user identification module is detected based on the working power (step S203), and if there is no inputting of the user's identity information (shown as "no" in the step S203), the step S203 is repeated. Conversely, if there is an inputting of the user's identity information (shown as "yes" in the step S203), the user's identity information is identified to determine whether or not the user may access the data (step S205). In some embodiments, the user's identity information includes a fingerprint, an iris, a voice or a shape of face etc.

In some embodiments, when the user's identity information is input to the storage device, the input user's identity information may be converted into an input cryptograph (step S211). Next, the input cryptograph is compared with a predetermined cryptograph stored in the database 111 to judge whether they match with each other (step S213). If not match (shown as "no" in the step S213), the storage device is then write-protected (step S209). Accordingly, the user cannot access or write the data stored in the storage device.

If the input cryptograph matches the predetermined cryptograph stored in the database 111 (shown as "yes" in the step S213), the user is allowed to access or write the data stored in the storage device (step S207).

In summary, in the write-protection module for a storage device having a user identification function and the method thereof provided by the present invention, since the natural energy can be converted into the power supply, the write-protection module of the storage device may be activated without aiding of an external power supply.

Moreover, since the write-protection module of the storage device may identify the user's identity and decrypt the storage device, application programmes of external software are unnecessary for encryption and decryption of the stored data.

Therefore, operation of the storage device of the present invention is independent, and aiding of the external power supply is unnecessary. The storage device is unnecessary to be coupled to the external computer system, and the storage device may be decrypted simply by inputting the user's identity information. Therefore, it will be more convenient for utilization. For example, if a user A is about to provide the data stored in his flash drive to a user B, he may just decrypt the flash drive and give it to the user B, and it is unnecessary for them to go to a place where a computer is located to perform the operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A storage device having a user identification function, comprising:
    a power supply module, for providing a working power, and the power supply module comprising:
        a first power unit, for providing a power;
        a second power unit; and
        a power controller, coupled to the first power unit and the second power unit, for charging the second power unit according to the power and outputting the working power;
    a user identification module, coupled to the power controller of the power supply module, for receiving the working power and a user's identity information, and the user identification module generating a comparison information according to the user's identity information; and
    a control unit, coupled to the user identification module, for determining whether or not the user may access the storage device according to the comparison information;
    wherein when the storage device is in a standby mode, the first power unit supplies the working power to the user identification module through the power controller, and charges the second power unit; when the user identification module is activated, the second power unit supplies the working power required by an operation of encryption or decryption.

2. The storage device having a user identification function as claimed in claim 1 further comprising:
    a storage unit, coupled to the control unit; and
    an interface unit, coupled to the control unit,
    wherein the control unit determines whether or not to output data stored in the storage unit via the interface unit, or store the data input from the interface unit into the storage unit according to the comparison information.

3. The storage device having a user identification function as claimed in claim 2, wherein the storage unit comprises a flash drive.

4. The storage device having a user identification function as claimed in claim 2, wherein the interface unit comprises a USB interface, a memory card interface, an IEEE1394 interface or an eSATA interface.

5. The storage device having a user identification function as claimed in claim 1, wherein the first power unit is a continuous power supply, which may convert a natural energy into the working power.

6. The storage device having a user identification function as claimed in claim 1, wherein the second power unit is a chargeable power device.

7. The storage device having a user identification function as claimed in claim 1, wherein the user identification module comprises:
    a user's identity information receiving unit, for receiving the input user's identity information;
    a database, for storing a predetermined cryptograph; and
    a microprocessor, coupled to the user's identity information receiving unit and the database, for converting the input user's identity information into an input cryptograph, and comparing the predetermined cryptograph stored in the database with the input cryptograph to generate the comparison information.

8. The storage device having a user identification function as claimed in claim 7, wherein the user's identity information receiving unit is a user identification module.

9. The storage device having a user identification function as claimed in claim 1, wherein the user's identity information comprises a fingerprint input.

10. A write-protection module for a storage device, comprising:
    a power supply circuit, for providing a working power, and the power supply circuit comprising:
        a first power unit;
        a second power unit; and
        a power controller, coupled to the first power unit and the second power unit, for charging the second power unit according to a power output from the first power unit, and generating the working power;
    a user identification module, for receiving a user's identity information based on the working power;
    a database, for storing a predetermined cryptograph; and
    a microprocessor for receiving the working power, coupled to the user identification module and the database for converting the user's identity information into an input cryptograph, and comparing the predetermined cryptograph stored in the database with the input cryptograph to generate a comparison information, so as to determines whether or not the user may access data stored in the storage device according to the comparison information;
    wherein when the storage device is in a standby mode, the first power unit supplies the working power to the user identification module through the power controller, and charges the second power unit; when the user identification module is activated, the second power unit supplies the working power required by an operation of encryption or decryption.

11. The write-protection module for a storage device as claimed in claim 10, wherein the first power unit is a continuous power supply, which may convert a natural energy into the working power.

12. The write-protection module for a storage device as claimed in claim 10, wherein the second power unit is a chargeable power supply.

13. A write-protection method for a storage device, the method comprising:

utilizing a first power unit to convert a natural energy, for providing a working power on the storage device and charging a second power unit;

detecting whether or not a user's identity information is input based on the working power; and switching from the first power unit to the second power unit for providing the working power and identifying the user's identity information when the user's identity information is input, so as to determine whether or not the storage device may be operated normally.

14. The write-protection method for a storage device as claimed in claim 13, wherein the step of identifying the user's identity information comprises:

converting the input user's identity information into an input cryptograph;

comparing the input cryptograph with a predetermined cryptograph;

controlling the storage device to operate normally when the input cryptograph matches the predetermined cryptograph; and setting the storage device in a write-protection state when the input cryptograph does not match the predetermined cryptograph.

15. The write-protection method for a storage device as claimed in claim 13, wherein the user's identity information comprises a fingerprint input, an iris image, a voice information and an image of a face shape of a user.

16. The write-protection method for a storage device as claimed in claim 13, wherein the natural energy comprises an environmental light source.

17. The write-protection method for a storage device as claimed in claim 13, wherein the storage device comprises an external storage apparatus.

18. The write-protection method for a storage device as claimed in claim 17, wherein the storage device comprises a flash drive and a memory card.

* * * * *